United States Patent [19]

Matsumoto

[11] Patent Number: 4,628,332

[45] Date of Patent: Dec. 9, 1986

[54] INK PRINTHEAD WITH HOLDER MOUNT

[75] Inventor: Haruyuki Matsumoto, Tokyo, Japan

[73] Assignee: Canon Kabushiki Kaisha, Tokyo, Japan

[21] Appl. No.: 693,167

[22] Filed: Jan. 22, 1985

[30] Foreign Application Priority Data

Jan. 30, 1984 [JP] Japan .................................. 59-13315

[51] Int. Cl.[4] .............................................. G01D 15/18
[52] U.S. Cl. .................................... 346/140 R; 346/75
[58] Field of Search .............................. 346/75, 140 R

[56] References Cited

U.S. PATENT DOCUMENTS 4,074,284 2/1978 Dexter et al. ................... 346/140 R
4,329,698 5/1982 Smith .............................. 346/140 R
4,333,088 1/1982 Diggins ........................... 346/140 R
4,475,116 10/1984 Sicking et al. ................. 346/140 R

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

In a liquid jet recording apparatus provided with a recording head for discharging recording liquid as flying liquid droplets, a head mounting portion for fixing the recording head, and liquid supply means for supplying the recording liquid to the recording head, the recording head and the head mounting portion are removably mounted by fixing means and the liquid supply means is removably connected to the recording head by coupling means.

13 Claims, 10 Drawing Figures

INK PRINTHEAD WITH HOLDER MOUNT

BACKGROUND OF THE INVENTION

1. Field of the Invention

This invention relates to a liquid jet recording apparatus which discharges liquid from a discharge port to form flying liquid droplets and effects recording by the use of the liquid droplets.

2. Description of the Prior Art

Non-impact recording methods have recently particularly attracted attention because the noise they generate during recording is negligible. Among methods ink jet recording (a liquid jet recording method), which is capable of high-speed recording and can effect full color recording without requiring the special process of fixing images on plain paper, is a very effective recording method and various systems of this method have heretofore been proposed, some of which have already been commercialized and some which are still being studied.

Such liquid jet recording methods comprise causing droplets of recording liquid (called ink) to fly and adhere to a recording medium to thereby accomplish recording, and are divided broadly into several types depending on the method of forming droplets of recording liquid and the method of controlling the direction in which the droplets fly.

Among those methods, the liquid jet recording methods disclosed, for example, in U.S. Pat. No. 3,683,212, U.S. Pat. No. 3,747,120 and U.S. Pat. No. 3,946,398 are so-called drop-on-demand recording methods which comprise causing liquid droplets to be discharged and fly from discharge orifices in response to a recording signal and causing the droplets to adhere to the surface of a recording medium to thereby accomplish recording. In this recording method, only the droplets necessary for recording are discharged, and this leads to the elimination of the necessity of installing special means for collecting and processing the discharged liquid unnecessary for recording, which in turn leads to the possibility of simplifying the apparatus itself or making the apparatus compact. This currently attracts attention because the direction of flight of the droplets discharged from the discharge orifices need not be controlled and that multicolor recording can be easily accomplished.

Also, a liquid jet recording method quite different in the principle of formation of flying droplets from the above-described liquid jet recording method is disclosed in Japanese Laid-open Patent Application No. 51837/1979. This liquid jet recording method is not only very effectively applicable to the aforementioned drop-on-demand recording method, but also can easily embody a recording head having a highly dense multi-orifice configuration and therefore has a feature that recorded images of high resolution and high quality can be obtained at a high speed.

The liquid jet recording apparatus used in these drop-on-demand recording methods generally includes a recording head provided with discharge ports (orifices) for discharging liquid droplets, liquid flow paths communicating with the respective orifices and having energy generating elements for forming flying droplets, and a liquid chamber communicating with the liquid flow paths and storing therein the liquid to be supplied to the liquid flow paths. These elements are fixed to a head mounting portion which is a part of the liquid jet recording apparatus.

Also, the recording head is generally small and therefore, the amount of recording liquid which can be stored in said liquid chamber can only accomplish recording for a very short time. Accordingly, the liquid chamber of the recording head is usually connected to liquid supply means having as a part thereof an ink tank for storing therein the liquid to be supplied to the liquid chamber.

Heretofore, in the apparatus of this type, as a method of fixing the recording head to the head mounting portion, it has been popular to pass fixing screws through through-holes formed in the recording head and fasten them to internally threaded holes formed in the head mounting portion, or to fasten the head by fixing screws in a similar manner through a head fixing keep plate. Also, as a method of connecting the liquid chamber of the recording head to the liquid supply means, it has been popular to connect a tubular member provided on the recording head to a flexible tube provided in the liquid supply means by fitting the latter to the former. However, the recording head is generally small and therefore, the mechanism for fixing the recording head to the head mounting portion and the mechanism for connecting the recording head to the liquid supply means are very small and these two mechanisms are disposed proximate to each other. Thus, according to the above-described method using the screw setting or the fitting of the tube, the mounting and dismounting of the recording head with respect to the head mounting portion and the connection and disconnection of the recording head to and from the liquid supply means has been very inconvenient. Therefore, the work of interchanging the recording head resulting from a trouble such as the clogging of the recording head cannot be carried out by the user and a serviceman must be called for such work. And, even if a serviceman is resorted to, the inconvenience of such an arrangement has been a problem. Such disadvantage has been greater in a droplet jet apparatus having a plurality of recording heads mounted as in a liquid jet recording apparatus for effecting multicolor recording, because the space between adjacent heads is small.

Among the parts of a liquid jet recording apparatus, the part of the lowest reliability is the recording head for the present and, where the commercial planning of liquid jet recording apparatuses is to be made, sufficient provision of the service system for interchange of recording heads is necessary as a premise, and this point has also been a great bottleneck against commercialization.

Such a problem is common not only to the above-described drop-on-demand type liquid jet recording apparatuses using heat energy generating elements, but also to other drop-on-demand type liquid jet recording apparatuses using electro-mechanical converting elements and further the so-called continuous type liquid jet recording apparatuses.

SUMMARY OF THE INVENTION

The present invention has been made in view of the above-noted disadvantages peculiar to the prior art and an object thereof is to eliminate the difficulty in mounting and dismounting the recording head with respect to the head mounting portion and the difficulty in connecting and disconnecting the recording head to and from the liquid supply means, to enable the interchange of the recording head by the user himself to be effected to thereby enable the commercialization of a liquid jet recording apparatus with the interchange of the recording head by the user as a premise and to provide a liquid jet recording apparatus in which the range of applicable parts can be greatly widened.

Another object of the present invention is to provide a liquid jet recording apparatus provided with a recording head for discharging recording liquid as flying liquid droplets, a head mounting portion for fixing the recording head, and liquid supply means for supplying the recording liquid to the recording head, wherein the recording head and the head mounting portion are removably mounted by fixing means and the liquid supply means is removably connected to the recording head by coupling means.

DESCRIPTION OF THE PREFERRED EMBODIMENTS

The present invention will hereinafter be described in detail by reference to the drawings.

Figure 1:
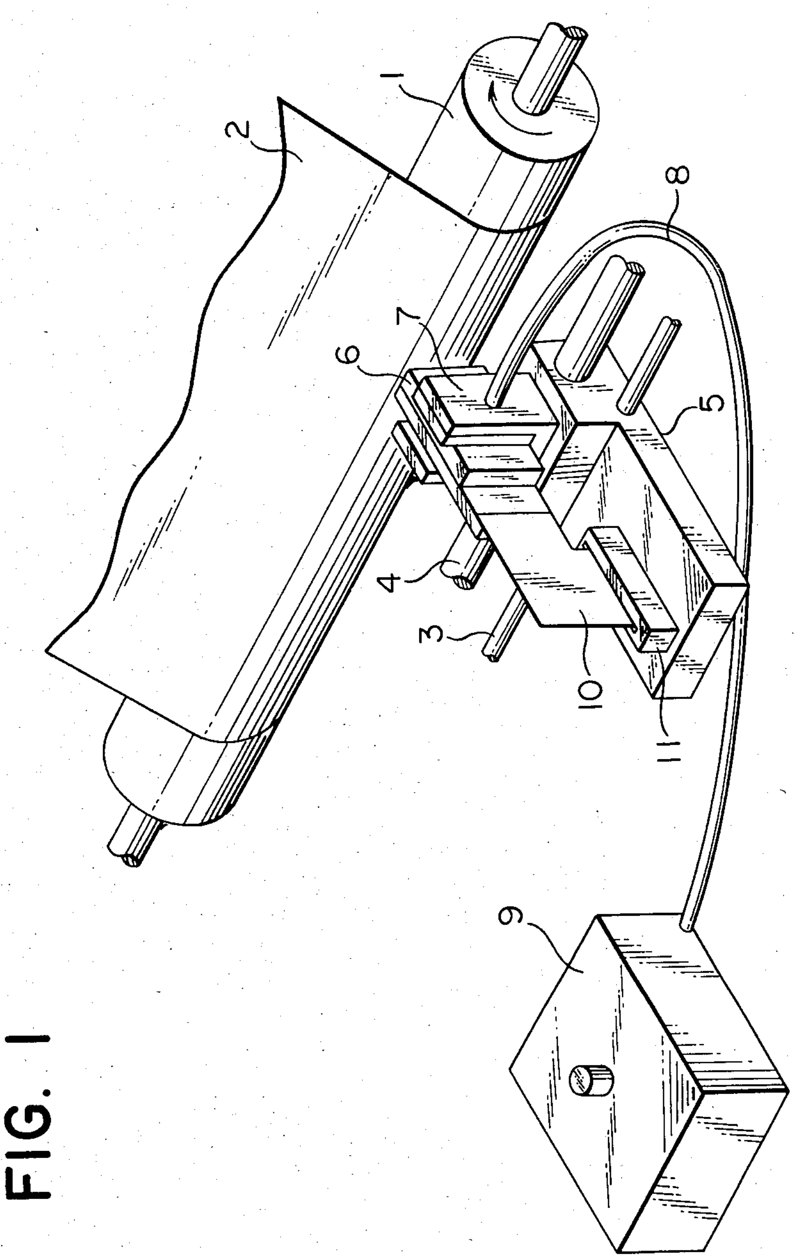
FIG. 1 is a perspective view schematically showing an embodiment of the liquid jet recording apparatus according to the present invention.

FIG. 1 is a perspective view showing an embodiment of the liquid jet recording apparatus according to the present invention and particularly showing the construction of the vicinity of the recording head thereof. In FIG. 1, reference numeral 1 designates a platen, reference numeral 2 denotes recording paper, reference numerals 3 and 4 designate two guide shafts, reference numeral 5 denotes a carriage, reference numeral 6 designates a recording head having an FPC (flexible printed substrate) 10 for electrical signal wiring, reference numeral 7 denotes a head mounting portion fixed to the carriage 5 by screws not shown, reference numerals 8 and 9 respectively designate an ink supply tube and an ink tank which together constitute liquid supply means, and reference numeral 11 denotes an electrical connector for connecting the FPC 10.

The supply of liquid from the ink tank 9 to the recording head 6 is effected through the ink supply tube 8. In the prior art, the ink supply tube 8 has been directly connected to the recording head 6 to supply ink to the recording head 6, but in the present embodiment, the ink supply tube 8 is connected to the head mounting portion 7 so that the liquid is supplied from a liquid intake port (not shown) provided in the recording head 6 to the recording head through a communication port (not shown) provided in the head mounting portion 7. Therefore, the recording head 6 can be removed from the head mounting portion 7 without the necessity of removing the ink supply tube 8 from the recording head 6 as in the prior art.

Figure 2A:
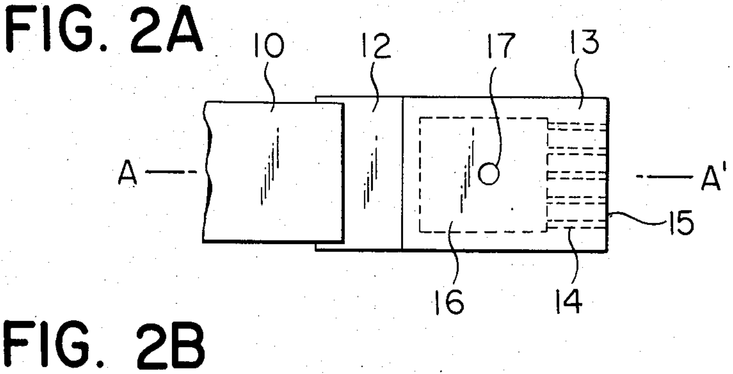
FIGS 2A–2E illustrate the detailed construction of the recording head and head mounting portion shown in FIG. 1.
Figure 2B:
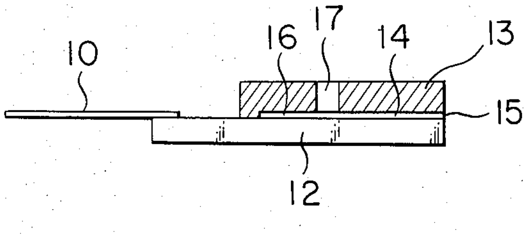

FIGS. 2A and 2B illustrate the details of the construction of the recording head shown in FIG. 1, FIG. 2A being a schematic side view of the recording head, and FIG. 2B being a schematic cross-sectional view of the recording head taken along line AA' of FIG. 2A. In FIGS. 2A and 2B, reference numeral 12 designates a first flat plate, reference numeral 13 denotes a second flat plate, and reference numerals 14, 15, 16 and 17 designate liquid flow paths, orifices, a liquid chamber and a liquid intake port, respectively, formed in the second flat plate. The liquid intake port 17 is of the same shape as the communication port (not shown) provided in the head mounting portion, and in the present embodiment, it is a circular aperture.

The recording head of the present embodiment has been made by using a material of a desired thickness and quality, for example, Pyrex glass having a thickness of 1 mm, as the first flat plate 12, forming a heat energy generating portion (not shown) having a heat energy generating member as a part of the construction thereof and a driving wiring pattern (not shown) on the Pyrex glass as by sputtering, evaporation or the photolithographic technique, using Pyrex glass similar to said Pyrex glass as the second flat plate 13, etching this Pyrex glass to form recesses corresponding to the orifices 15 and the liquid chamber 16 and a circular aperture which is the liquid intake port 17, and thereafter cementing the two flat plates together.

Figure 2C:
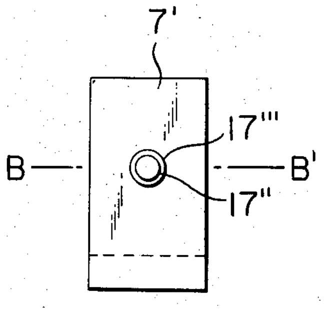
Figure 2D:
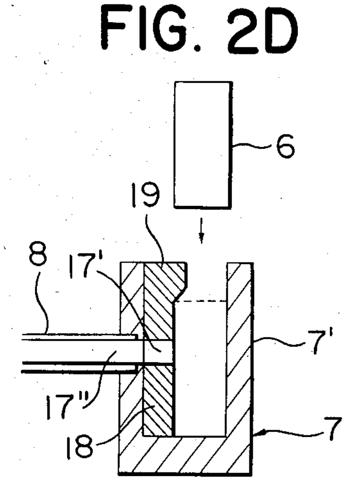

FIGS. 2C and 2D illustrate the details of the construction of the head mounting portion, FIG. 2C being a schematic side view of the head mounting portion as seen from the same direction as the schematic side view of the recording head shown in FIG. 2A, and FIG. 2D being a schematic cross-sectional view of the head mounting portion taken along line BB' of FIG. 2C and as seen from the platen side.

In FIGS. 2C and 2D, reference numeral 7' designates a head mounting member of a material of a desired thickness and quality, for example, a head mounting member of aluminum having a thickness of 2–3 mm, and reference numeral 18 denotes a fixing member for fixing the recording head 6. The fixing member 18 comprises a rubber member for pressing the recording head 6 to prevent leakage of the liquid and is adhesively secured to the head mounting member 7'. The head mounting member 7' and the rubber member 18 together constitute the head mounting portion 7, and the mounting-dismounting of the recording head 6 with respect to the head mounting portion 7 is effected along the direction of the arrow in FIG. 2D. Circular communication ports 17'' and 17' corresponding to the liquid intake port (not shown) of the recording head 6 are formed in the head mounting member 7' and the rubber member 18, respectively. When the recording head 6 is inserted to a position indicated by the dotted line in FIG. 2D, the liquid intake port of the recording head 6 communicates with the communication ports 17' and 17'' so that the ink is supplied, and in this case, the rubber member 18 presses the recording head 6 to thereof prevent leakage of the liquid. Reference numeral 19 designates the convex portion of the rubber member. This convex portion 19 comprises fixing means for holding down the recording head 6 when inserted to the dotted line position and fixing the recording head 6 to the head mounting portion 7. That is, the rubber member 18 in the present embodiment has both of the function as the fixing means for the recording head 6 and the function as the coupling means for the recording head 6 and the liquid supply means, and is a structure in which the fixing means and the coupling means are made integral with each other.

Reference numeral 8 designates an ink supply tube. The ink supply tube 8 is inserted in the head mounting member 7' to the depth of a guide hole 17'' provided concentrically with the hole 17' of the head mounting member 7′ and is fixed to the head mounting member 7′ by a set mechanism, not shown, for example, a removably mountable mechanism such as a set pin or the like.

According to the above-described construction, the recording head 6 is reliably fixed to the head mounting portion 7 simply by pushing it into the head mounting portion 7 and at the same time, it is connected so that the supply of the liquid from the liquid supply means to the recording head 6 takes place. In this case, if the dimensions of the surface of the portion of the recording head 6 which contacts the head mounting portion 7 are accurately finished in advance, the vertical positioning of the recording head 6 can also be accomplished easily. On the other hand, the removal of the recording head 6 from the head mounting portion 7 can be easily accomplished by widening the convex portion 19 of the rubber member.

Figure 2E:
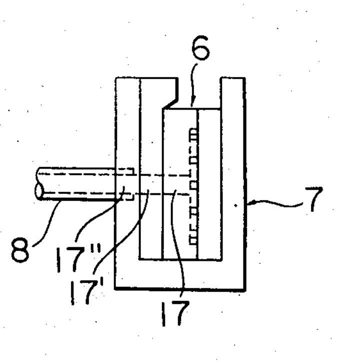

FIG. 2E illustrates the recording head 6 as it is mounted on the head mounting portion 7, and it is a schematic front view of the head mounting portion as seen from the orifice side of the recording head 6. As indicated by broken lines in FIG. 2E, when the recording head 6 is mounted on the head mounting portion 7, the liquid intake port 17 of the recording head 6 and the ink supply pipe 8 of the liquid supply means communicate with each other through the communication ports 17′ and 17″ of the head mounting portion so that the ink is supplied from the liquid supply means to the recording head 6.

According to the liquid jet recording apparatus of the above-described construction, the recording head and the head mounting portion are fixed by removably mountable fixing means, for example, in the present embodiment, the rubber member, and the supply of liquid from the liquid supply means to the recording head is effected through the head mounting portion and therefore, the difficulty in mounting and dismounting the recording head with respect to the head mounting portion as has been experienced in the prior art and the difficulty in connecting and disconnecting the recording head to and from the liquid supply means are eliminated at a stroke, and it becomes possible to effect the mounting and dismounting of the recording head with respect to the head mounting portion by one touch.

The coupling means for removably connecting the liquid supply means to the recording head is not limited to the above-described example, but for example, it is also possible that a mating member in the form of a pipe or the like connected to the ink supply tube is passed through a hole such as the aforedescribed communication port formed in the head mounting portion and the mating member is removably connected to the liquid intake port of the recording head. The fixing means is neither limited to the above-described rubber member, but for example, various fixing means using a spring or the like are also applicable. The fixing means and the coupling means need not always be made integral with each other, but for example, it is also possible to use the above-described rubber member only as the fixing means and connect the above-mentioned mating member or the like directly to the recording head without the intermediary of the head mounting direction. Also, the fixing means may be provided with electrical connecting means connected to the recording head, for example, FPC for electrical signal wiring. Alternatively, it is also possible that the recording head is designed to bear against the head mounting portion when the recording head is mounted and electrical connecting means is provided in that portion of the head mounting portion against which the recording head bears.

Figure 3:
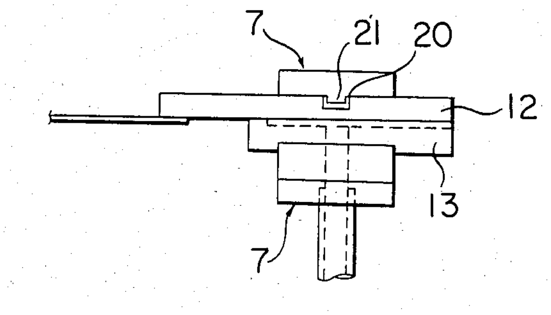
FIGS. 3 to 5 show modifications of the recording head and head mounting portion.

FIG. 3 shows a first modification of the recording head and head mounting portion in the above-described embodiment and is a plan view of the head mounting portion as seen from the direction of arrow indicated in FIG. 2D in a state in which the recording head has been installed. As shown in FIG. 3, a groove 20 as a mating portion for positioning formed as by a diamond wheel is provided in a first flat plate 12 of the recording head 6 in this embodiment, and a convex portion 21 corresponding to this mating portion is provided in the head mounting portion 7. The construction of the recording head 6 and head mounting portion 7 in the present embodiment is the same as the construction of the recording head and head mounting portion in the previously described embodiment with the exception that the groove 20 and convex portion 21 which are the positioning means for the recording head 6 and head mounting portion 7 are provided. By the groove 20 and convex portion 21 being provided, it becomes possible to reliably maintain the distance between the recording head and the recording paper (not shown) always at a desired position. Of course, in the case of the previously described embodiment as well, it is sufficiently possible to hold the recording head at a desired position, but the construction of the present embodiment makes the holding of the recording head more reliable. The function of positioning the recording head may also be provided by providing, in addition to the groove and convex portion, step differences in the recording head and the fixing means, respectively, or the portion of the liquid supply means which is coupled to the recording head may be endowed with the positioning function. Further, a convex portion and a socket or a step difference or the like may be formed in the head mounting portion and the recording head, respectively, thereby accomplishing the positioning. Of course, the positioning is not limited to the above-described methods.

Figure 4A:
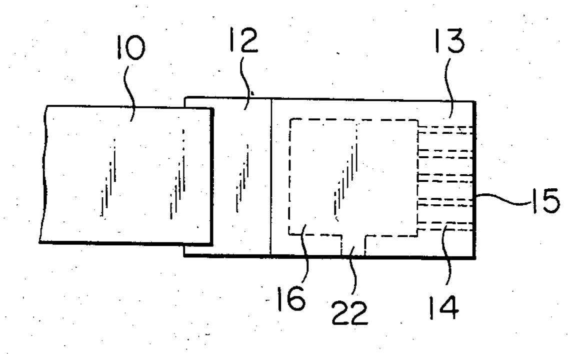
Figure 4B:
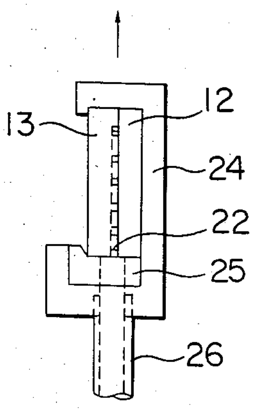

FIG. 4 shows a second modification of the recording head and head mounting portion in the previously described embodiment, FIG. 4A being a schematic side view of the recording head, and FIG. 4B being a schematic front view of the head mounting portion with the recording head installed thereon. In FIG. 4A, reference numeral 22 designates a liquid intake port formed in the end surface of the recording head 6. In FIG. 4B, reference numeral 24 designates a head mounting member, reference numeral 25 denotes a rubber member formed with a liquid supply hole, reference numeral 26 designates an ink supply tube, and the arrow indicates the direction in which the head mounting portion 7 is mounted on a carriage. In the case of the present embodiment, the recording head 6 is urged toward the rubber member 25 and is mounted on the head mounting member 24 while compressing the rubber member 25. On the other hand, the removal of the recording head 6 from the head mounting member 24 may be accomplished by an operation reverse to the above-described operation.

According to the above-described construction, the ink supply tube is mounted on the head mounting member from a direction perpendicular to the scanning direction of the recording head in FIG. 1 (the widthwise direction of the recording head) and therefore, the widthwise space of the recording head 6 can be economized, and this is effective to make the apparatus compact. Also, the liquid intake port 22 of the recording head 6 can be formed simultaneously with the liquid flow paths 14 and the liquid chamber 16 being formed in the second flat plate 13 and therefore, the liquid intake port 22 need not be newly formed, and this leads to very good productivity.

The liquid intake port 22 formed in the end surface of the recording head may be provided only in the second flat plate 13 as described above, or may be provided only in the first flat plate 12. As a further alternative, recesses corresponding to the liquid intake port 22 may be formed in both of the first flat plate 12 and the second flat plate 13 and a liquid intake port 22 may be formed by cementing these two flat plates together. Of course, in the case of the present embodiment, design may be made such that the positioning of the distance between the recording head and the recording paper as described in connection with FIG. 3 can be accomplished.

While the present invention has been described by taking as an example a drop-on-demand type liquid jet recording apparatus using a heat energy generating element, the present invention is also applicable to other drop-on-demand type liquid jet recording apparatus using an electro-mechanical converting element or a continuous type liquid jet recording apparatus.

In the above-described embodiments, the rubber member is adhesively secured to the head mounting member, but alternatively, the rubber member may be adhesively secured to the recording head, or the rubber member may be adhesively secured neither to the recording head nor to the head mounting member and the rubber member may be inserted and fixed between the recording head and the head mounting portion, for example, when the recording head is fixed to the head mounting portion. Further, the rubber member may be replaced by high molecular resin having appropriate elasticity such as polyethylene resin, polypropylene resin or polyacetal resin, and also the head mounting member may be formed by any of these materials and the head mounting member itself may be used as the fixing means for the recording head. Also, the first purpose of the rubber member used in the above-described embodiments is to prevent the leakage of the liquid from the liquid intake port of the recording head and the communication port of the head mounting portion and in the present invention, the means for fixing the recording head to the head mounting portion is not always limited to an elastic member such as the rubber member, but for more reliable fixing of the recording head, fixing screws, fixing pins or the like may be used together with the rubber member.

Figure 5:
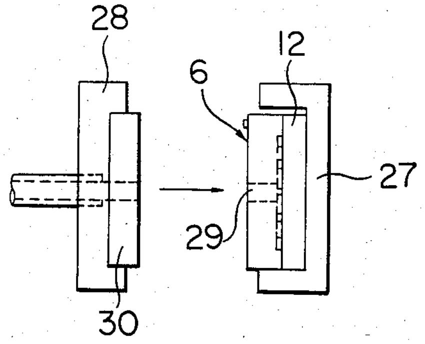

Further, as shown in FIG. 5, a recording head 12 may be placed on a first head mounting member 27, whereafter a recording head 6 may be held down by a second head mounting member 28 having rubber member 30 thereon, and the head mounting members 27 and 28 may be fixed by junction means such as a band, not shown, whereby the recording head 6 may be fixed and at the same time, the liquid intake port 29 of the recording head 6 may be communicated with the liquid supply means.

According to the present invention, as has been described above, the difficulty in mounting and dismounting the recording head with respect to the head mounting portion and the difficulty in connecting and disconnecting the recording head to and from the liquid supply means are eliminated. Further, the interchange of the recording head by the user himself is also possible and the range of parts applicable to the liquid jet recording apparatus can be greatly widened.

I claim:

1. A liquid jet recording apparatus comprising:

a recording head for discharging recording liquid as flying liquid droplets, a head mounting portion for fixing said recording head, fixing means disposed interiorly of said head mounting portion and including an elastic material for removably attaching said recording head to said head mounting portion, and liquid supply means including an opening extending through said head mounting portion and said fixing means for supplying recording liquid to said recording head.

2. A liquid jet recording apparatus according to claim 1, wherein said fixing means includes electrical connection means for connection to said recording head.

3. A liquid jet recording apparatus according to claim 1, wherein said fixing means includes means for positioning said recording head.

4. A liquid jet recording apparatus according to claim 1, wherein said fixing means is a rubber member.

5. A liquid jet recording apparatus according to claims 1, wherein said fixing means is formed of high molecular resin.

6. A liquid jet recording apparatus according to claims 1, wherein said fixing means is removably mounted.

7. A liquid jet recording apparatus according to claim 1, wherein said fixing means is provided on said head mounting portion.

8. A liquid jet recording apparatus according to claim 1, wherein said fixing means is provided on said recording head.

9. A liquid jet recording apparatus according to claim 1, wherein said head mounting portion includes electrical connection means.

10. A liquid jet recording apparatus according to claim 1, wherein said recording head includes a mating portion for positioning said recording head relative to said head mounting portion.

11. A liquid jet recording apparatus according to claim 1, wherein:

said head mounting portion includes a contact member for contacting said recording head, and said elastic material is disposed for urging said recording head against said contact member to attach said recording head to said head mounting portion.

12. A liquid jet recording apparatus according to claim 11, wherein said elastic material includes a convex portion for capturing said recording head.

13. A liquid jet recording apparatus according to claim 11, wherein said liquid supply means includes means for attaching a supply conduit to said head mounting portion.

* * * * *

UNITED STATES PATENT AND TRADEMARK OFFICE

CERTIFICATE OF CORRECTION

PATENT NO. : 4,628,332

DATED : DECEMBER 9, 1986

INVENTOR(S) : HARUYUKI MATSUMOTO

It is certified that error appears in the above-identified patent and that said Letters Patent is hereby corrected as shown below:

COLUMN 1

Line 13, "methods" should read --such methods,--.

Line 44, "This currently" should read --This method currently--.

COLUMN 2

Line 46, "of" should read --with--.

COLUMN 4

Line 59, "of the" should read --the--.

COLUMN 5

Line 54, "neither" should read --also not--.

Line 62, "direction" should read --portion--.

Signed and Sealed this

Fourteenth Day of April, 1987

*Attest:*

DONALD J. QUIGG

*Attesting Officer*

*Commissioner of Patents and Trademarks*